J. V. ROBINSON.
AUTOMATIC TRAIN PIPE CONNECTOR.
APPLICATION FILED DEC. 5, 1913. RENEWED SEPT. 13, 1917.

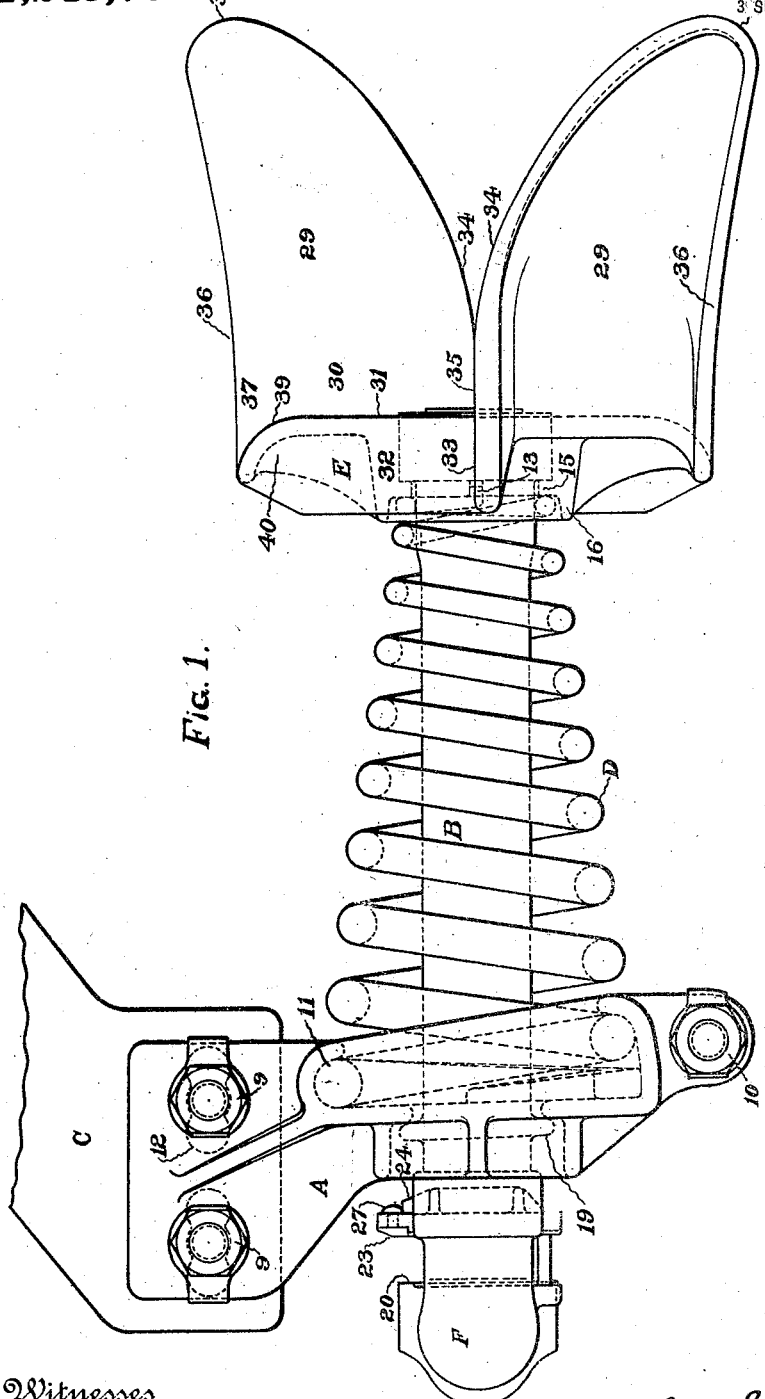

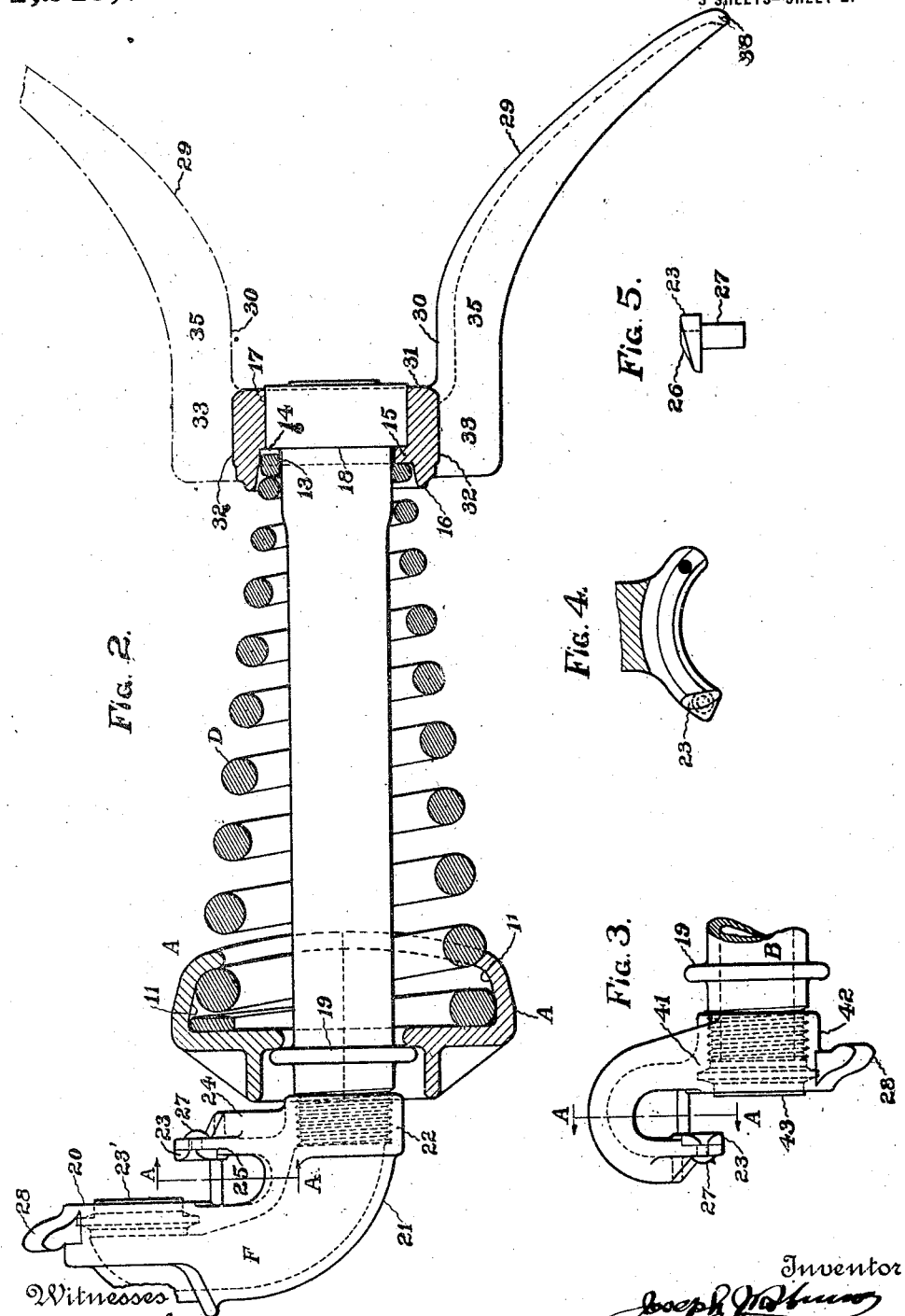

1,245,785.

Patented Nov. 6, 1917.
3 SHEETS—SHEET 3.

Witnesses
L. A. Brooke
M. C. Sheridan

Inventor
Joseph V. Robinson
J. H. Watson
Attorney

UNITED STATES PATENT OFFICE.

JOSEPH V. ROBINSON, OF BRANFORD, CONNECTICUT.

AUTOMATIC TRAIN-PIPE CONNECTOR.

1,245,785. Specification of Letters Patent. Patented Nov. 6, 1917.

Application filed December 5, 1913, Serial No. 804,898. Renewed September 13, 1917. Serial No. 191,308.

*To all whom it may concern:*

Be it known that I, JOSEPH V. ROBINSON, a citizen of the United States, and resident of Branford, county of New Haven, State of Connecticut, have invented certain new and useful Improvements in Automatic Train-Pipe Connectors, of which the following is a specification.

This invention relates to automatic train pipe connectors and has among its objects to provide an improved coupling head of simple construction that will be inexpensive to make and having guiding means adapted to accurately aline the head with a mating connector, free from all binding and jamming of the heads, when coupling on sharp curves and under conditions of extreme inequality in the height of cars; and to provide also an improved interchange for coupling up a car equipped with the automatic connector with one not so equipped. Other novel features of construction will appear from the following description and in the accompanying drawings, in which:

Figure 1 is a side elevation of the improved connector.

Fig. 2 is a horizontal sectional view of Fig. 1.

Fig. 3 is a top plan view of a modification of the interchange shown in Figs. 1 and 2.

Fig. 4 is a detail view taken on the line A—A of Figs. 2 and 3, showing the lock embodied in the construction of the interchange.

Fig. 5 is a side elevation of the above lock.

Figure 6:
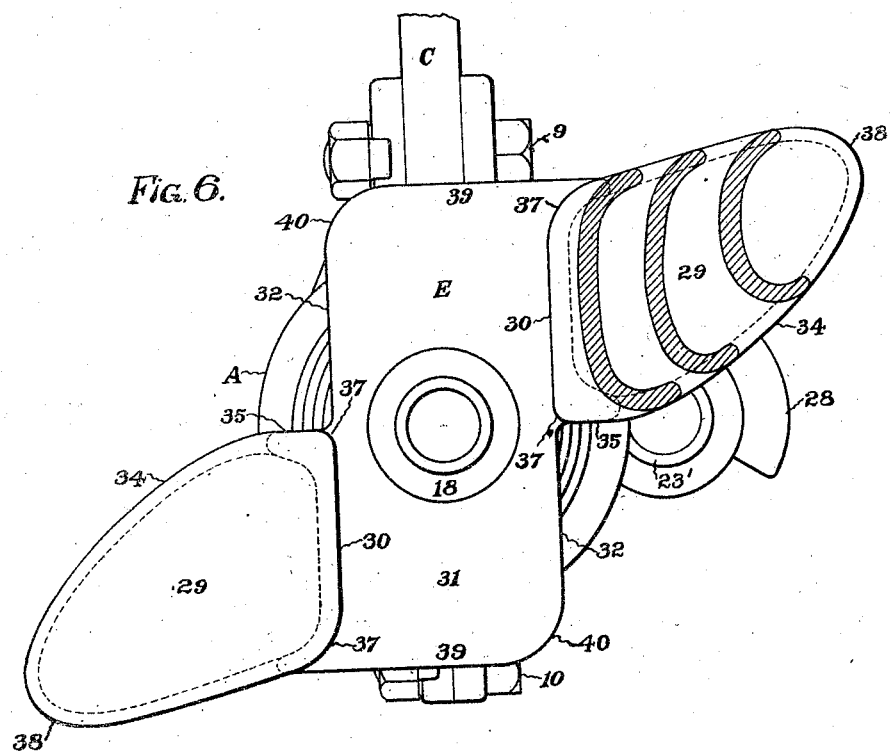
Fig. 6 is a front elevation of the parts shown in Fig. 1.
Figure 7:
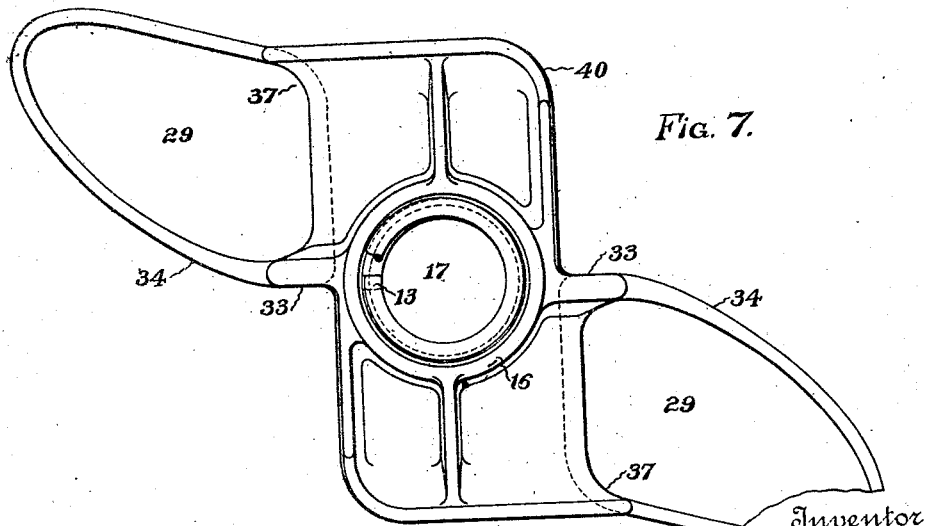
Fig. 7 is a rear elevation of the connector head showing the manner of engaging the supporting spring therewith.

Referring more particularly to the drawings: My invention comprises a two-piece base A provided with grooves 11 in which the base coil of the spring D is rigidly clamped against rotary movement when the pieces of the base are bolted together by the bolts 9 and 10 in assembling. The base suspends the connector from a lug C, which is suitably connected to the car, and is adjustable relative to the lug along the slots 12.

The spring D is coiled of a tapered bar and is provided at its small end with a bent-out portion 13 that extends into a complementary notch 14 in the flange 15 of the coupling head E, to lock the head against rotation relative to the spring. In this manner the head is held in proper position for coupling, but permitted to rotate slightly about its axis to accommodate the rocking movement of cars. Such rotation of the head, of course, twists the spring, since the spring is locked against rotary movement in the base, producing a torsional resistance which will return the head to its normal position when the twisting strains are relieved. A flange 16 is provided at the rear of the coupling head to give strength to the latter and surrounds the small end of the spring, as shown.

The pipe or stem B is assembled into the opening 17 of the head from the front of the latter and is provided with a shoulder 18 for abutting against the flange 15 which flange projects from the head into the opening 17, see Fig. 2. The head is free to move rearwardly on the pipe to a slight extent to permit close connection of the gaskets of opposing pipes should dirt or foreign substances prevent contact of the faces of the heads.

The pipe extends axially through the spring D and the base A and is free to oscillate in any direction relative to the base and may also rotate freely therein and in the head. It carries a rib or flange 19 normally bearing against the rear face of the base to limit the forward movement of the head E with respect to the base. The rib is positioned on the pipe in such manner as to maintain the spring D under slight compression between the head and the base A, whereby the spring normally acts to hold the flange 15 of the head constantly against the shoulder 18 of the pipe and maintain the head in proper position on the pipe.

A metallic interchange or coupling device F having a face 20 of the contour of the present standard hose coupling and carried in a vertical plane parallel with the face of the connector head E, is provided for convenience in connecting the hose of a car equipped with the automatic connector to the hose of a car not so equipped. The interchange has a shank 21 threaded at 22 to receive the rear threaded end of the pipe B to which pipe it is connected. The opening in the interchange at its point connection with the pipe is in line with the axis of the end of the pipe to which it is secured and by virtue of the loose fit of the pipe in the base A and the head E; the interchange is free to rotate readily about said axis.

In adapting the interchange to service, the coupling in the end of the hose of the car being equipped is coupled into the interchange by rotating the interchange upward and then placing said coupling in the usual position on the face of the interchange and rotating the interchange back to normal position. The operation is the same as that of connecting the present hand system, except instead of rotating both the interchange and the coupling in the hose, only the interchange is rotated.

When it is desired to make air connection with a car not having the connector, the hose mentioned is disconnected from the interchange F, by rotating the latter upward relative to the coupling in the hose, and is then swung around the connector head and coupled with the hose of the unequipped car the same as the present system is coupled.

With this arrangement a short length of hose can be used to couple my automatic connector with the train pipe of the car without impairing ready connection or disconnection of the hose to and from the interchange. In constructions where the interchange cannot be rotated in the manner described, it is necessary to use a long section of hose to couple from it to the train line in order to get sufficient flexibility in the hose to rotate the coupling it carries into the position required by such constructions to couple into the interchange.

A lock 23 for preventing accidental uncoupling of the hose from the interchange is carried by the arm 24 of the interchange, the arm being provided with a depression at 25 to receive the lock. The lock consists of a rivet having a tapered face 26 and a cylindrical shank 27 (see Fig. 5). The shank extends through a hole in the arm 24 of the interchange and is riveted therein as shown. The lip 28 of the coupling in the end of the hose of the car being equipped is held behind the lock 23 by the resiliency of the gasket 23' in the interchange and also by the pressure of the air passing through the hose and the interchange. A slight turn of the coupling of said hose, rotating the coupling toward the face of the interchange, lifts the lip 28 of the coupling out from behind the lock 23, whereupon the parts may be readily disconnected in the manner previously described.

This construction of lock and the free rotary movement of the interchange F with the pipe B, relative to the base A, eliminates all danger of accidental uncoupling of the hose from the interchange and prevents kinking of the hose when the cars pass around sharp curves or assume other extreme conditions of disalinement.

A modification of the interchange device F, shown in Figs. 1, 2 and 6, is illustrated in Fig. 3. It consists of a head 41 provided with a straight shank 42 extending parallel with the axis of the gasket 43 in the face of the head 41, and threaded for connection with the pipe B. In all other respects this type of interchange is constructed the same as interchange F. To use it with best results, it is desirable however to locate the hose of the car being equipped on the opposite side of the car to present standard.

The coupling head E is of substantially rectangular outline viewed from the front and is provided with diagonally spaced guiding prongs or wings 29 which diverge in the vertical and horizontal planes and extend forwardly of the face 31 of the head. The prongs are preferably two in number and serve to aline mating heads in coupling on curves, etc. Each of the prongs is provided at its base with a surface 30 (see particularly Fig. 2) which extends forwardly of the face 31 of the head and at a right angle thereto and which lies entirely in the vertical plane. These surfaces are machined to constitute complementary surfaces for fitting closely with the portions 32 at the sides of a mating head, which portions are also machined and extend rearwardly of the face of the head E and at a right angle thereto.

The head is further provided at its base with portions 33 which lie entirely in the horizontal plane, on the transverse center line of the head, and which extend rearwardly from the face 31 of the latter and at a right angle thereto. To constitute complementary surfaces for mating with these portions 33 of the head, the inner guiding edge 34 (Fig. 6) of the prongs 29, is provided with a surface 35 that lies also entirely in the horizontal plane, on the transverse center line of the head E, and which extends forwardly of the face 31 thereof and at a right angle thereto.

The prongs are further provided with an outer guiding edge 36 and both this edge and the inner guiding edge 34 are curved slightly in the vertical plane at 37 where they leave the face of the head. These curved sections constitute the only sections of the prongs that are curved in the vertical plane at the face of said coupling head. The pitch of the curves 37 changes as they approach the forward extremity 38 of the prongs and gradually die out into one curve which encompasses the whole face of the prong 29 instead of only a part, producing a distinct convexed face, as shown particularly in Fig. 6.

This construction of head and prongs has many advantages. Where heads are provided with right angle portions, such as 32 and 33, for mating with complementary surfaces on their guiding prongs, such as surfaces 30 and 35, difficulty is encountered in effecting a coupling, with the present form of prongs, on sharp curves with cars of unequal height.

The form of the prongs of the present invention insures accurate alinement of said right angle portions with the complementary surfaces mentioned, in advance of meeting of the faces 31 of mating coupling heads, whereby the last inch or so of movement of mating heads is strictly parallel as they socket together. In this manner a firm and rigid interlock of the heads is effected which will prevent any relative angular or lateral movement between their faces 31 under the sharp whipping movement of running cars.

To further facilitate coupling of the heads under a combination of extreme vertical and lateral disalinement, where one prong of mating heads might tend to wedge on the top of the other head, the face 31 of the head E is rounded at 39, as are also the corners 40.

No claim is herein made to the novel features of the particular form of coupling head described in the foregoing specification. Claims covering this subject-matter are included in another application Serial No. 825,837 filed March 19, 1914.

Having thus described the invention, what is claimed and desired to be secured by Letters Patent is:

1. In an automatic train pipe coupling, the combination of a yieldable support, a coupling head carried by said support, a hollow member extending from said head substantially at right angles to the face of said head for directing a fluid thereto, and a metallic coupling device mounted directly on said member, said coupling device being provided with a face carried in a plane parallel with the face of said coupling head.

2. In an automatic train pipe coupling, the combination of a base, a coupling head supported from the base and movable relative thereto, a hollow metallic member extending from said head for directing a fluid thereto, said member being rotatable relative to the head, and a coupling device connected with said member and adapted to rotate therewith.

3. In an automatic train pipe coupling, the combination of a base, a coupling head supported for movement relative to said base, a tube extending from said head for directing a fluid thereto, and a metallic coupling device connected with one end of said tube and adapted to rotate relative to said base about the longitudinal axis of the end of said tube to which it is connected.

4. In an automatic train pipe coupling, the combination of a base, a coupling head supported for movement relative to said base, a stem extending from said head through said base and rotatable relative to the head and base, and a coupling device connected with said stem and adapted to rotate therewith.

5. In an automatic train pipe coupling, the combination of a base, a coupling head supported for movement relative to said base, a stem extending loosely through said head and base, a coupling device connected to said stem behind said base, and means for preventing excessive rotation of said head relative to said base, said means tending normally to maintain the head in correct position for coupling.

6. In an automatic train pipe coupling, the combination of a base, a coupling head supported from said base, a stem extending from said head and carrying a coupling device for receiving the coupling in the end of the hose of the car, an arm on said coupling device having an opening, and a lock on said arm for preventing accidental disconnection of the hose from said coupling device, said lock consisting of a rivet having a tapered head and having also a shank, the shank being extended through the opening in said arm and riveted to the latter.

7. In an automatic train pipe coupling, the combination of a base, a head, a coiled spring having its ends abutting the base and head respectively, a tube connecting the base and head and adapted to limit separation thereof under the action of the spring while permitting movement of the tube about its axis relative to the base and head, and means for connecting the tube with a train pipe.

8. In an automatic train pipe coupling, the combination of a base, a head, a tube provided with means for attachment to a train pipe and adapted to rotate in apertures in the base and head, a rib on said tube for limiting movement of the head away from the base, and a coiled spring surrounding the tube and confined between the base and head.

9. In an automatic train pipe coupling, the combination of a coupling head adapted to be connected with a train pipe and having an opening in its face, a flange extending from the head into said opening, and a stem mounted in the opening and provided with a shoulder abutting said flange whereby said head is locked against undue forward movement on said stem.

10. In an automatic train pipe coupling, the combination of a coupling head adapted to be connected with a train pipe and having an opening in its face, a flange extending from the head into said opening, a stem loosely mounted in the opening and provided with a shoulder abutting said flange whereby said head may move rearwardly along said stem from its normal position thereon but not forwardly from such position.

11. In an automatic train pipe coupling, the combination of a base, a coupling head supported for movement relative to said base and adapted to be connected with a train pipe and having an opening in its face, a flange extending from the head into such opening, a stem mounted in the opening and provided with a shoulder abutting said flange, and a spring confined between said head and base and acting normally to hold said head at the limit of its forward movement on said stem.

12. In an automatic train pipe coupling, the combination of a coupling head of substantially rectangular outline and having an opening in its face, a base, means coöperating with said base to support said head, and a tube extending through the opening in said head and provided with means for attachment to a train pipe whereby it is adapted to conduct a fluid from the rear of the head to a point approximately flush with the face thereof.

In testimony whereof I affix my signature in presence of two witnesses.

JOSEPH V. ROBINSON.

Witnesses:
M. C. SHERIDAN,
J. A. WATSON.